(12) United States Patent
Otani et al.

(10) Patent No.: US 10,416,446 B2
(45) Date of Patent: Sep. 17, 2019

(54) HEAD-UP DISPLAY

(71) Applicant: Panasonic Intellectual Property Management Co., Ltd., Osaka (JP)

(72) Inventors: Sosuke Otani, Osaka (JP); Yoshimasa Fushimi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/630,218

(22) Filed: Jun. 22, 2017

(65) Prior Publication Data

US 2018/0003970 A1 Jan. 4, 2018

(30) Foreign Application Priority Data

Jun. 30, 2016 (JP) .................................. 2016-130322

(51) Int. Cl.
*G02B 27/01* (2006.01)

(52) U.S. Cl.
CPC ..... *G02B 27/0101* (2013.01); *G02B 27/0149* (2013.01); *G02B 2027/011* (2013.01); *G02B 2027/015* (2013.01); *G02B 2027/0145* (2013.01)

(58) Field of Classification Search
CPC ............. G02B 27/01; G02B 27/0101; G02B 27/0149; G02B 27/0136; G02B 27/014; G02B 27/0141; G02B 27/0154; G02B 27/015; B60R 11/04; Y02T 10/84
USPC .......... 359/618, 627, 629–631, 633, 13, 14; 340/905, 980; 348/148, 115, 142; 345/7
See application file for complete search history.

(56) References Cited

U.S. PATENT DOCUMENTS

| | | | | |
|---|---|---|---|---|
| 5,625,493 A | * | 4/1997 | Matsumura | G02B 27/0172 359/630 |
| 6,377,370 B1 | * | 4/2002 | Taketomi | G03H 1/0402 359/13 |
| 2005/0099606 A1 | | 5/2005 | Fushimi et al. | |
| 2010/0164702 A1 | * | 7/2010 | Sasaki | G01B 21/22 340/438 |
| 2012/0212841 A1 | * | 8/2012 | Wang | G02B 13/16 359/784 |
| 2013/0135748 A1 | * | 5/2013 | Sato | G02B 27/0101 359/630 |
| 2016/0147074 A1 | * | 5/2016 | Kobayashi | G02B 3/0006 345/7 |

(Continued)

FOREIGN PATENT DOCUMENTS

| | | |
|---|---|---|
| JP | 2003-185964 | 7/2003 |
| JP | 2004-126226 | 4/2004 |

(Continued)

*Primary Examiner* — Stephone B Allen
*Assistant Examiner* — Travis S Fissel
(74) *Attorney, Agent, or Firm* — Wenderoth, Lind & Ponack, L.L.P.

(57) ABSTRACT

A head-up display causes light modulated by an optical modulation element to form, via a projection lens, an intermediate image on a screen, and then causes the intermediate image to reflect, via a mirror, on a windshield to allow a user to view a virtual image. A normal line of the screen is inclined with respect to an optical axis of the projection lens. An emission surface of the optical modulation element is inclined with respect to the screen and a principal plane of the projection lens so as to satisfy a Scheimpflug condition.

6 Claims, 8 Drawing Sheets

(56) References Cited

U.S. PATENT DOCUMENTS

2017/0115485 A1* 4/2017 Saito ................. G02B 27/0149
2017/0299862 A1* 10/2017 Yamaguchi ........ G02B 27/0101

FOREIGN PATENT DOCUMENTS

| JP | 2009-205032 | 9/2009 |
| JP | 2014-149405 | 8/2014 |

* cited by examiner

| φ | 1.3° |
|---|---|
| θ | 20° |
| f | 7.07mm |
| L1 | 7.5mm |
| L2 | 120mm |

FIG. 7

TRANSVERSE ABERRATION VIEW

FIG. 8

DISTORTION

HEAD-UP DISPLAY

BACKGROUND

1. Technical Field

The present disclosure relates to a head-up display mounted in a vehicle, such as a car.

2. Description of the Related Art

Unexamined Japanese Patent Publication No. 2004-126226 discloses a basic configuration of a head-up display. Specifically, Unexamined Japanese Patent Publication No. 2004-126226 discloses the head-up display for allowing a driver to view light modulated by display 30 (optical modulation element) as a virtual image. The modulated light is formed into a real image (intermediate image), via lens 40 (projection lens), on image forming member 50 (screen). The above-described real image (intermediate image) is reflected by reflecting mirrors 60, 70 (mirrors). The reflected light is then reflected by a windshield (combiner) to allow the driver to view the virtual image.

Unexamined Japanese Patent Publication No. 2014-149405 discloses a technology for preventing visibility of a virtual image from lowering due to incident natural light by inclining a normal line of transmissive screen 18 (screen) of a head-up display with respect to optical axis AX.

SUMMARY

A head-up display according to the present disclosure includes a projection lens, a screen, and a mirror. The projection lens causes light modulated by an optical modulation element to form an intermediate image on the screen. The mirror projects the intermediate image formed on the screen onto a combiner. The head-up display causes the intermediate image projected by the mirror to reflect on the combiner to allow a user to view a virtual image.

A normal line to a surface of the screen is inclined with respect to an optical axis of the projection lens.

An emission surface of the optical modulation element is inclined with respect to a principal plane of the projection lens so as to satisfy a Scheimpflug condition with respect to the emission surface of the optical modulation element, the surface of the screen, and the principal plane of the projection lens.

With the head-up display according to the present disclosure, while preventing visibility of a virtual image from lowering due to incident natural light, image light emitted from the optical modulation element can properly be formed into an image on the screen.

DETAILED DESCRIPTION

In the head-up display disclosed in Unexamined Japanese Patent Publication No. 2014-149405, the normal line of the transmissive screen is inclined with respect to the optical axis of the lens. Therefore, image light emitted from a digital micromirror device (DMD, or optical modulation element) would not properly form an image on the transmissive screen.

Exemplary embodiments will be described herein in detail with reference to the drawings appropriately. However, detailed descriptions more than necessary might be sometimes omitted. For example, there is a case where detailed description of already well-known items and repeated description with respect to substantially the same configuration are omitted. These omissions are made to avoid unnecessary redundancy of the following description, and to facilitate the understanding of those skilled in the art.

Note that the attached drawings and the following description are provided for those skilled in the art to fully understand the present disclosure, and are not intended to limit the subject matter as described in the appended claims.

First Exemplary Embodiment

A first exemplary embodiment of the present disclosure will now be described herein with reference to FIGS. 1 to 9.

1-1. Overall Configuration

Figure 1:
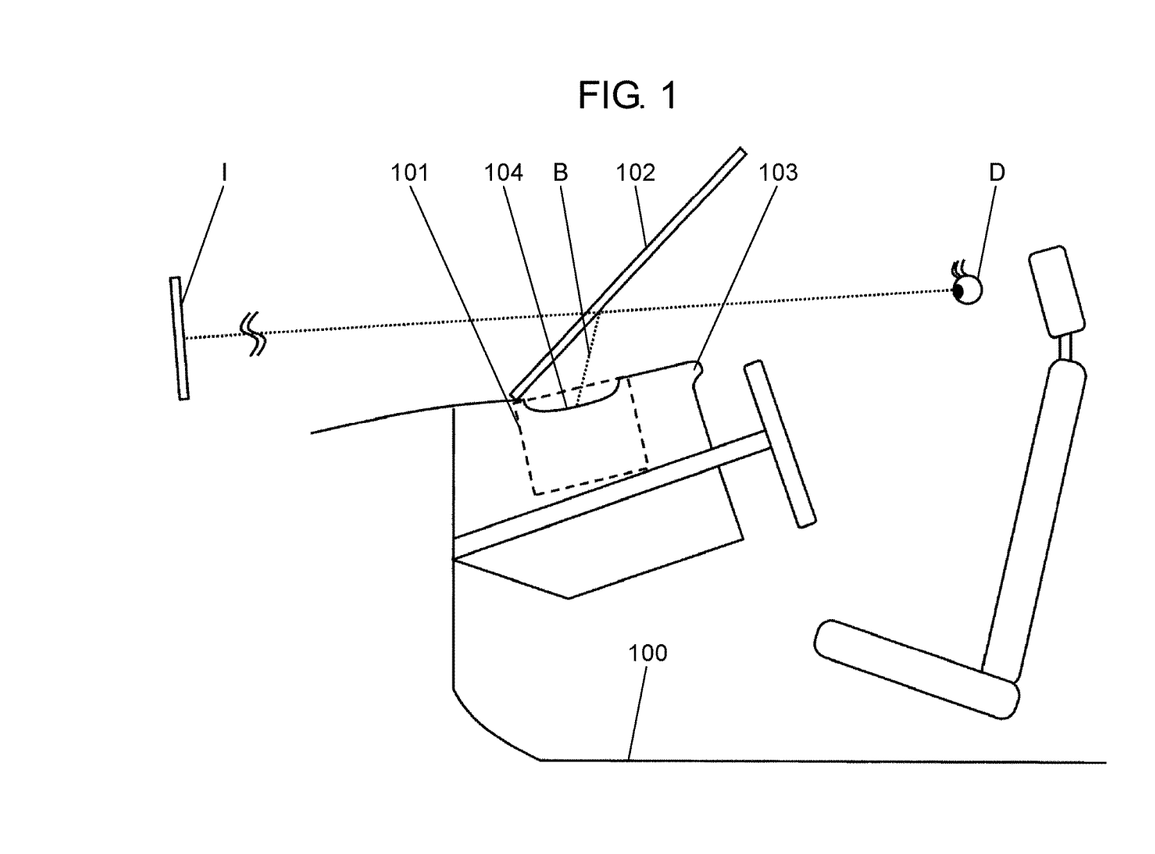
FIG. 1 is a partial schematic view of a vehicle equipped with a head-up display according to a first exemplary embodiment.

FIG. 1 is a partial schematic view of vehicle 100 equipped with head-up display (hereinafter also referred to as an HUD) 101 according to the first exemplary embodiment.

As shown in FIG. 1, head-up display 101 is disposed in dashboard 103. Head-up display 101 emits image light B through opening 104. Emitted image light B is reflected by windshield 102. Head-up display 101 is an image display device allowing driver D (user) to view virtual image I.

Windshield 102 is an example of a combiner. The combiner is a transmissive optical element taking a role of superimposing a second image that is a background and a first image formed from image light B emitted from head-up display 101. In this exemplary embodiment, the second image is a front view that driver D views through windshield 102. Onto this front view, virtual image I formed from image light B emitted from head-up display 101 is superimposed by windshield 102. Therefore, driver D is able to view an image in which the first image and the second image are superimposed. In this exemplary embodiment, the combiner is windshield 102 that is a component of vehicle 100. However, another component may be used. The combiner may be, for example, a half mirror provided separately from windshield 102.

1-2. Configuration of HUD

Figure 2:
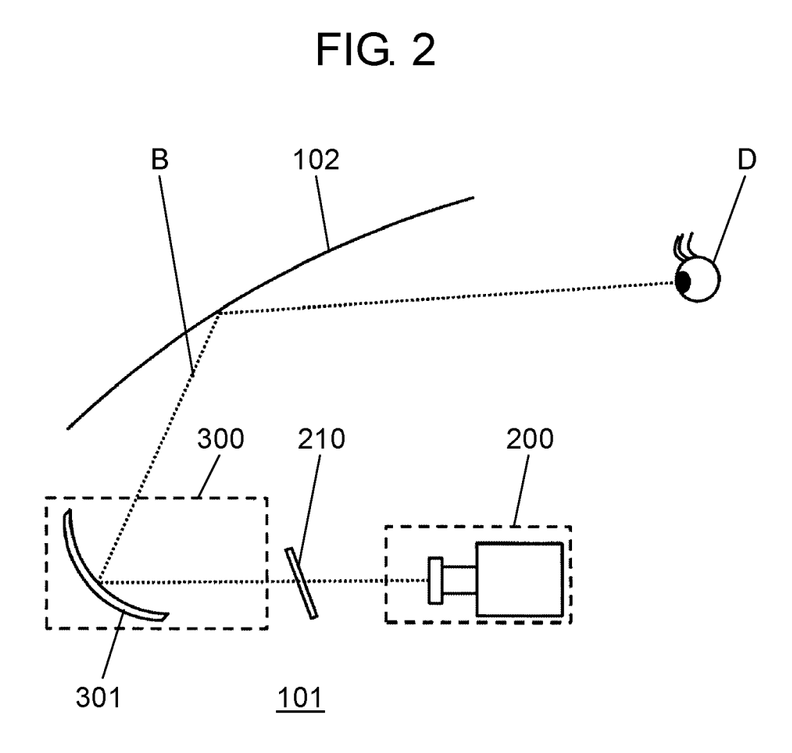
FIG. 2 is a schematic view illustrating a configuration of the head-up display according to the first exemplary embodiment.

FIG. 2 is a schematic view of head-up display 101 according to the first exemplary embodiment, when viewed from a side of the vehicle. Head-up display 101 includes projection type image display unit 200, screen 210, and virtual image display unit 300.

Figure 3:
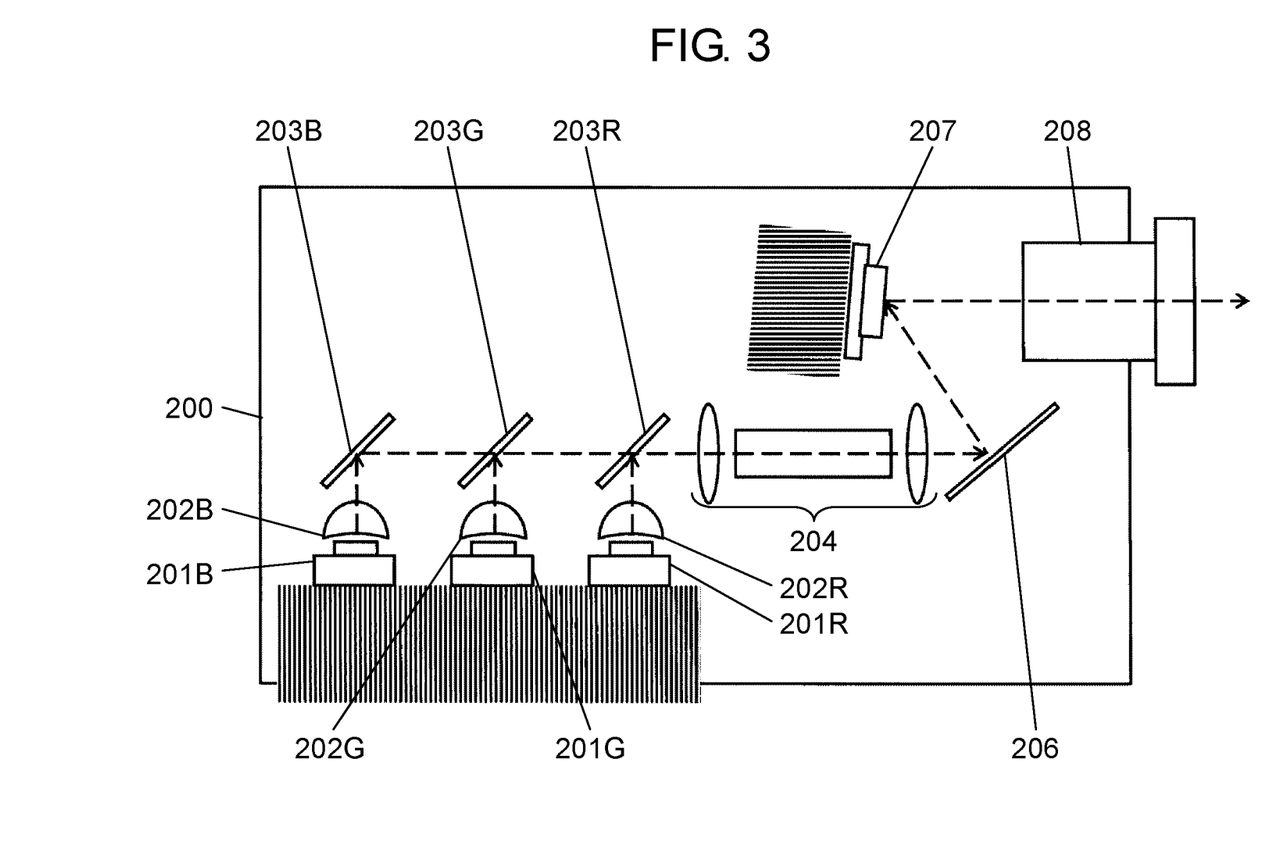
FIG. 3 is a schematic view illustrating a configuration of a projection type image display unit according to the first exemplary embodiment.

FIG. 3 is a schematic view illustrating a configuration example of projection type image display unit 200. Projection type image display unit 200 includes light sources 201R, 201G, and 201B, collimate lenses 202R, 202G, and 202B, dichroic mirrors 203R, 203G, and 203B, optical integrator 204, mirror 206, optical modulation element 207, and projection lens 208.

Light source 201R emits red light. Light source 201G emits green light. Light source 201B emits blue light. Light-emitting diodes (LEDs), semiconductor lasers, and other light sources may be used to configure light sources 201R, 201G, and 201B.

Collimate lenses 202R, 202G, and 202B are respectively provided to correspond to light sources 201R, 201G, and 201B. Collimate lenses 202R, 202G, and 202B respectively collimate light emitted from light sources 201R, 201G, and 201B.

Dichroic mirrors 203R, 203G, and 203B respectively are mirrors that each reflect light in a certain wavelength range, but that allow light having other wavelengths to pass through. Dichroic mirror 203B reflects blue light passed through collimate lens 202B. Dichroic mirror 203G reflects green light passed through collimate lens 202G, but allows blue light reflected by dichroic mirror 203B to pass through. Dichroic mirror 203R reflects red light passed through collimate lens 202R, but allow blue light passed through dichroic mirror 203G and green light reflected by dichroic mirror 203G to pass through.

Optical integrator 204 includes a rod, convex lenses, and other components to make incident light uniform, and to emit the uniform light.

Mirror 206 reflects the light emitted from optical integrator 204.

Optical modulation element 207 optically modulates and reflects the incident light. For example, a digital micromirror device (DMD), a liquid crystal display (LCD), and other components can be used to configure optical modulation element 207.

Projection lens 208 magnifies at a predetermined magnification ratio and projects the light reflected by optical modulation element 207.

According to projection type image display unit 200 described above, light emitted from light sources 201R, 201G, and 201B is approximately collimated by collimate lenses 202R, 202G, and 202B, and then combined by dichroic mirrors 203R, 203G, and 203B. The combined light is made uniform by optical integrator 204, is reflected by mirror 206, and enters into optical modulation element 207. The light entered into optical modulation element 207 is optically modulated by optical modulation element 207, is reflected, and is projected as image light through projection lens 208.

As shown in FIG. 2, screen 210 is disposed near a position at which image light projected from projection type image display unit 200 is formed into an image. Screen 210 diffuses the projected light entering from projection type image display unit 200. For example, a transmissive diffuser including a diffuser plate and a micro lens array may be used to configure screen 210.

Virtual image display unit 300 includes mirror 301 having a concave face. Mirror 301 is a reflection type optical element having positive power, and having, for example, a rotationally asymmetric free-form surface.

Figure 4:
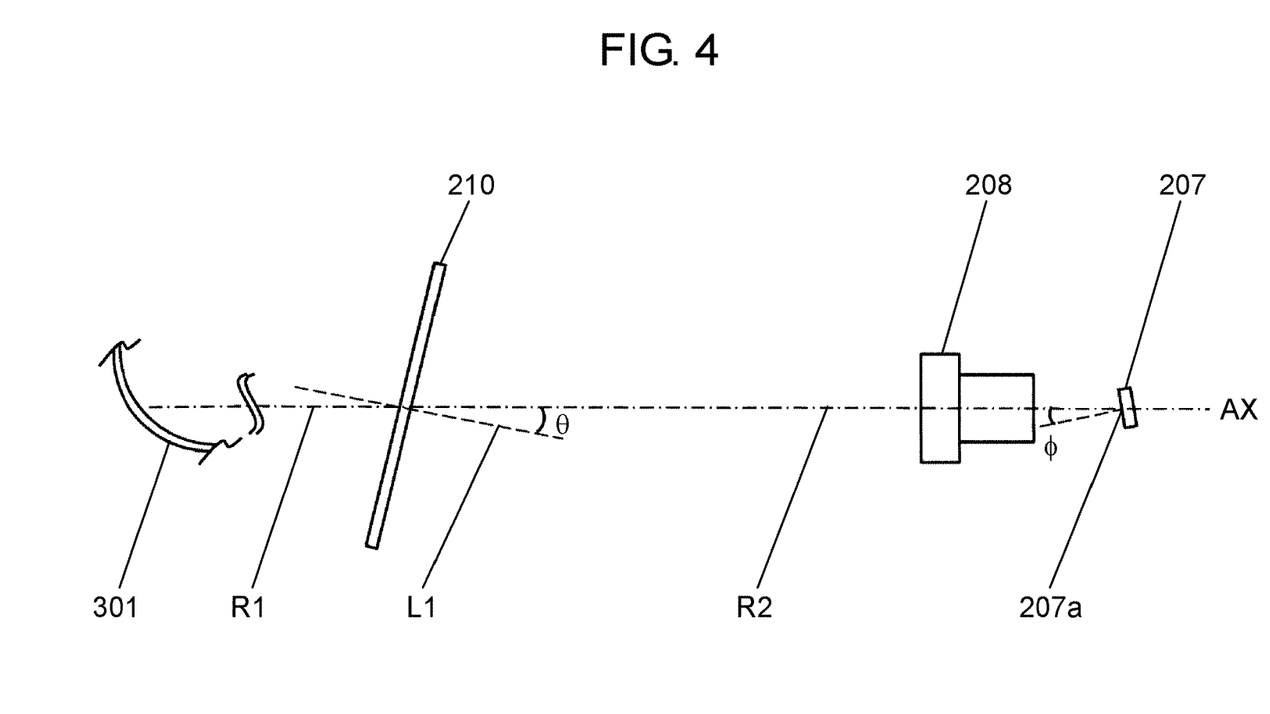
FIG. 4 is a partial schematic view illustrating a main portion in a projection type image display device according to the first exemplary embodiment.

FIG. 4 is a view for describing a positional relationship among optical modulation element 207, projection lens 208, screen 210, and mirror 301 in projection type image display unit 200.

In FIG. 4, chief ray R1 and chief ray R2 are both parallel to optical axis AX of projection lens 208. In image light B emitted from screen 210, chief ray R1 is a light beam lying at a center of image light B. In image light B emitted from optical modulation element 207, chief ray R2 is a light beam lying at the center of image light B.

Normal line L1 of screen 210 is inclined at angle θ with respect to optical axis AX of projection lens 208. Emission surface 207a of optical modulation element 207 is inclined at angle φ with respect to optical axis AX of projection lens 208. Angle θ and angle φ are determined so as to satisfy a Scheimpflug condition with respect to screen 210 and a principal plane of projection lens 208.

Figure 5:
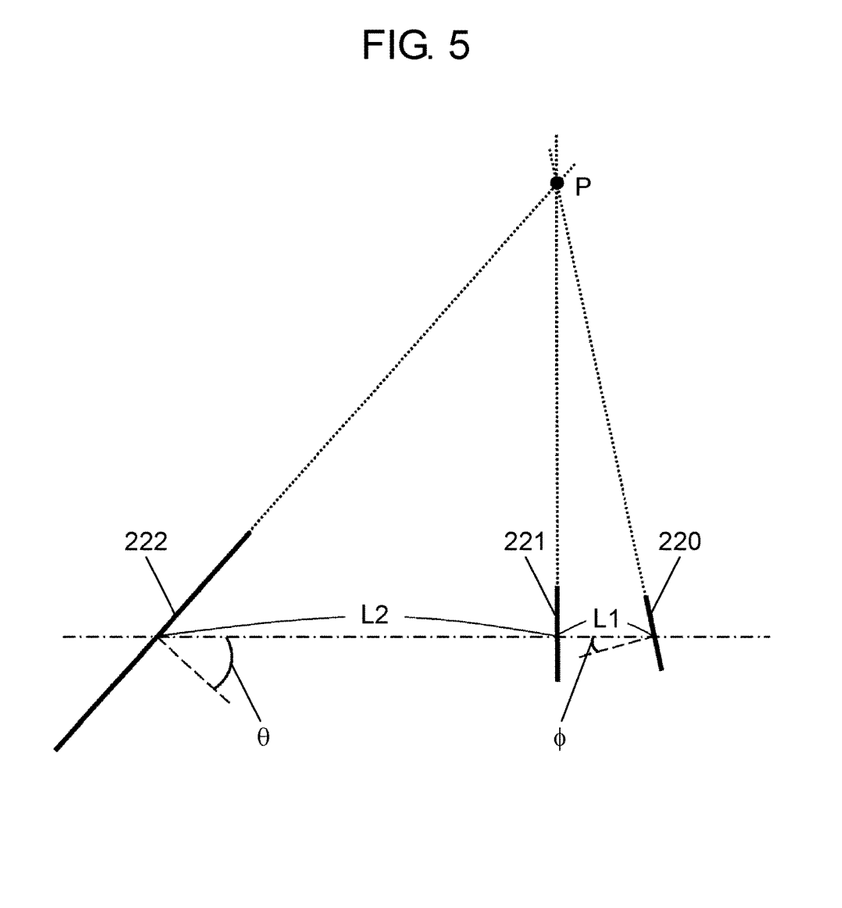
FIG. 5 is a view for describing a Scheimpflug condition.

FIG. 5 is a view for describing the Scheimpflug condition. The Scheimpflug condition refers to a condition for achieving a conjugate between virtual plane 220 and virtual plane 222. In FIG. 5, virtual plane 220 (corresponding to the emission surface of optical modulation element 207 in this exemplary embodiment) is disposed inclined at angle φ with respect to principal plane 221 of the lens (corresponding to projection lens 208 in this exemplary embodiment). Virtual plane 222 (corresponding to a light-receiving surface of screen 210 in this exemplary embodiment) is disposed inclined at angle θ with respect to principal plane 221. A point at which lines extended from virtual plane 220 and principal plane 221 intersect each other is specified as point P. According to the Scheimpflug condition, when virtual plane 222 extends and passes through point P, the conjugate between virtual plane 222 and virtual plane 220 is established.

Figure 6:
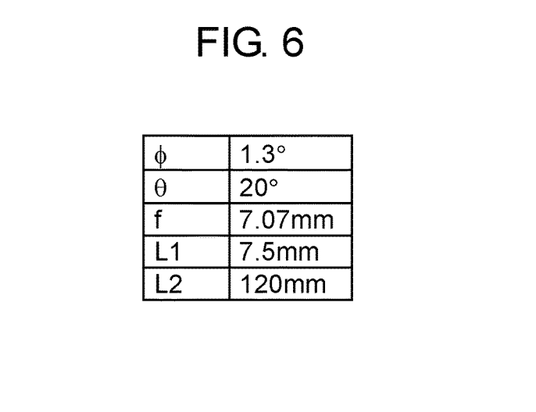
FIG. 6 is a table of numerical values of parameters used in a specific example satisfying the Scheimpflug condition.

FIG. 6 is a table of example values satisfying the Scheimpflug condition, where

φ: an angle formed by an optical axis of the lens and a normal line of virtual plane 220, θ: an angle formed by the optical axis of the lens and a normal line of virtual plane 222, f: focal distance f of the lens, L1: a distance from a center of virtual plane 220 to a center of principal plane 221 of the lens, and L2: a distance from the center of principal plane 221 of the lens to a center of virtual plane 222.

Figure 7:
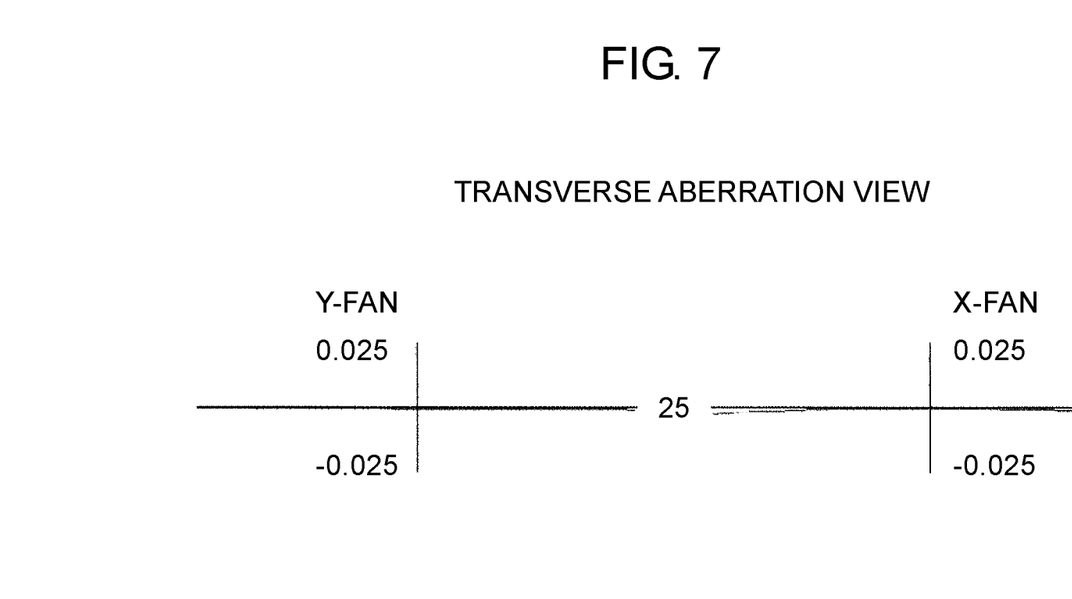
FIG. 7 is a transverse aberration view of the specific example satisfying the Scheimpflug condition.

FIG. 7 is a transverse aberration view of virtual plane 222 in an optical system shown in FIG. 5 when the values shown in FIG. 6 are used. A horizontal axis represents a coordinate in an entrance pupil, and a vertical axis represents a transverse aberration. According to FIG. 7, a transverse aberration is fully reduced on virtual plane 222, and therefore virtual plane 222 and virtual plane 220 are in the conjugate.

Figure 8:
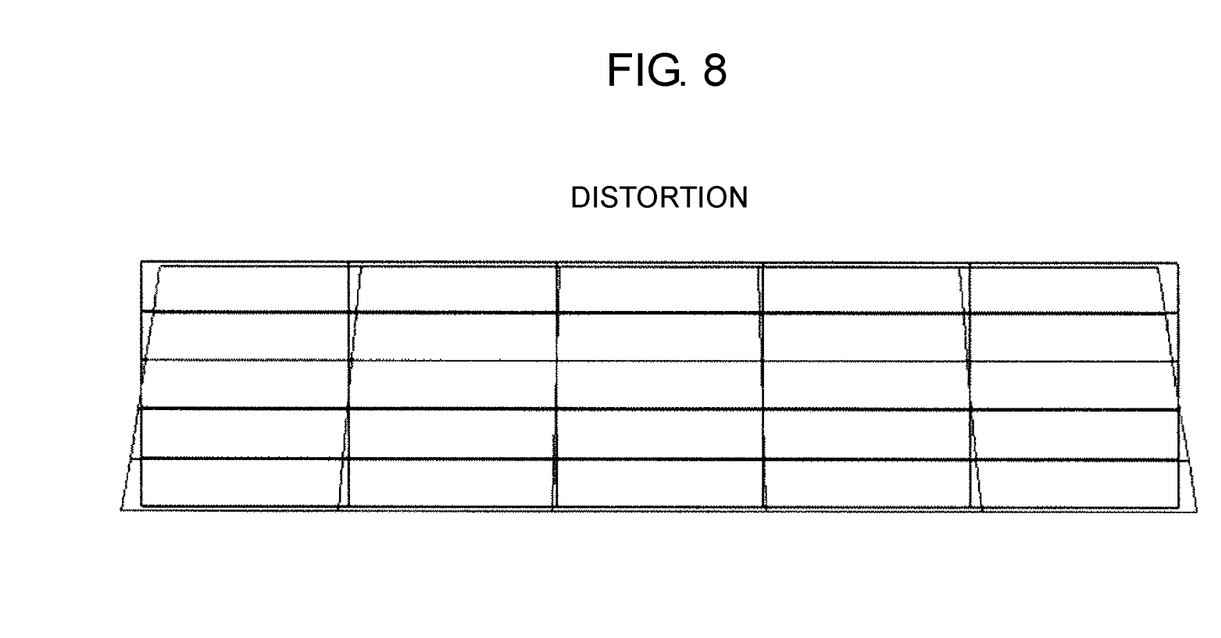
FIG. 8 is a view illustrating a distortion observed in the specific example satisfying the Scheimpflug condition.

FIG. 8 is a view illustrating a distortion observed in virtual plane 222 in the optical system shown in FIG. 5 when the values shown in FIG. 6 are used. According to the optical system shown in FIG. 5, the image shown in a rectangular shape on virtual plane 220 is shown in a trapezoidal shape on virtual plane 222. An intermediate image shown in a trapezoidal shape may be corrected by virtual image display unit 300 to allow driver D to view the intermediate image as a rectangular-shaped image. The intermediate image shown in the trapezoidal shape may be used as is to allow driver D to view the trapezoidal shape.

Figure 9:
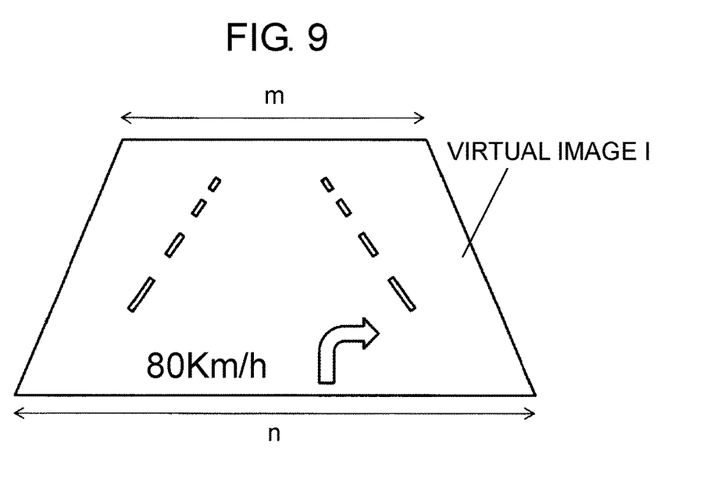
FIG. 9 is a schematic view illustrating an imaging area of the head-up display.

FIG. 9 is a view illustrating an example image having a trapezoidal shape that driver D views as is. Normally in a background viewed by driver D through windshield 102 (not shown in FIG. 9), as a distance to an object extends farther in a direction along a road, the object becomes smaller and lies at a higher position in a field of view. Therefore, virtual image I viewed by driver D via windshield 102 should preferably also become smaller in size when the image is farther in the direction along the road, and lies at a higher position in the field of view. Accordingly, virtual image I should preferably be shown in a trapezoidal shape having an upper base shorter than a lower base.

In this exemplary embodiment, optical modulation element 207, projection lens 208, and screen 210 are disposed so as to satisfy the Scheimpflug condition. The emission surface of optical modulation element 207 is inclined with respect to the principal plane of projection lens 208, and the surface of screen 210 is inclined with respect to the principal plane of projection lens 208. Therefore, the intermediate image will be able to have a trapezoidal shape having a lower base longer than an upper base. Therefore, virtual image I to be viewed by driver D can be shown in a trapezoidal shape having an upper base shorter than a lower base. The upper base of the intermediate image corresponds to the upper base of virtual image I. In other words, the upper base of the intermediate image corresponds to an upper side of virtual image I, when viewed from driver D.

1-3. Effects and Other Benefits

Head-up display 101 according to the present disclosure causes light modulated by optical modulation element 207 to form, via projection lens 208, an intermediate image on screen 210. Head-up display 101 also projects the intermediate image, via mirror 301, onto windshield 102 (combiner) to cause the projected intermediate image to reflect on windshield 102 to allow driver D (user) to view a virtual image.

The normal line to the surface of screen 210 is inclined with respect to optical axis AX of projection lens 208.

The emission surface of optical modulation element 207 is inclined with respect to the principal plane of projection lens 208 so as to satisfy the Scheimpflug condition with respect to the emission surface of optical modulation element 207, the surface of screen 210, and the principal plane of projection lens 208.

With head-up display 101 according to the present disclosure, while preventing visibility of a virtual image from lowering due to incident natural light, image light emitted from optical modulation element 207 can properly be formed into an image on screen 210.

In this exemplary embodiment, screen 210 is a transmissive screen. A chief ray (first chief ray) lying at a center of image light B emitted from optical modulation element 207 and optical axis AX of projection lens 208 are parallel to each other. A chief ray (second chief ray) lying at a center of image light B emitted from screen 210 and optical axis AX of projection lens 208 are parallel to each other.

Therefore, light projected from projection type image display unit 200 can effectively enter into virtual image display unit 300, and thus, while preventing brightness from lowering, image light emitted from optical modulation element 207 can form an image on screen 210.

In this exemplary embodiment, an intermediate image has a trapezoidal shape having an upper base that is regarded as an upper side of a virtual image, and a lower base longer than the upper base.

Therefore, the virtual image can be displayed in a shape similar to a shape of a background viewed through windshield 102.

Second Exemplary Embodiment

Figure 10:
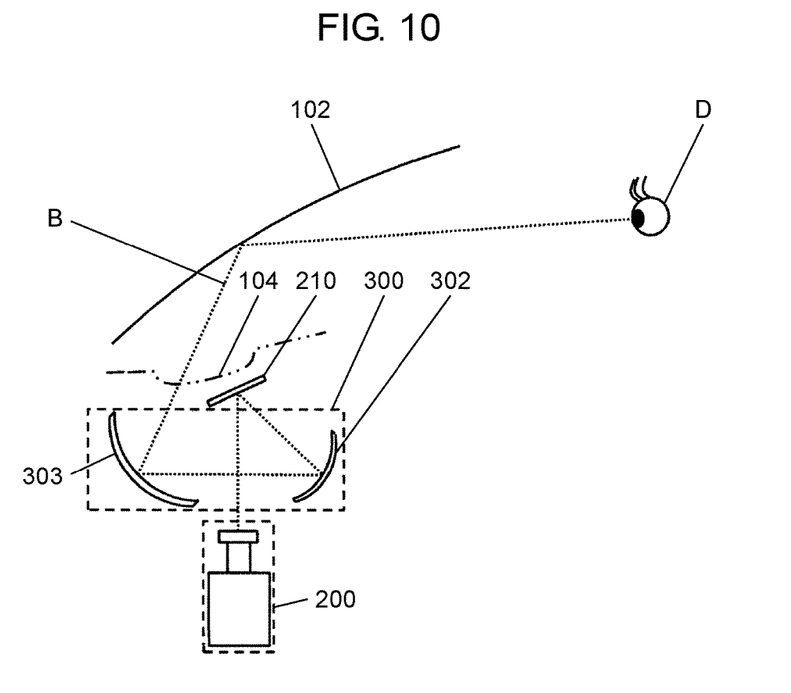
FIG. 10 is a schematic view illustrating a configuration of a head-up display according to a second exemplary embodiment.

Head-up display 101 according to a second exemplary embodiment will now be described herein. FIG. 10 is a schematic view illustrating a configuration of head-up display 101 according to the second exemplary embodiment. In this exemplary embodiment, differences from the first exemplary embodiment will mainly be described. The components similar or identical to the components of the first exemplary embodiment are applied with identical numerals or symbols.

2-1. Configurations of HUD and Other Components

Different from the first exemplary embodiment, the second exemplary embodiment uses a reflective diffuser as screen 210. A transmissive diffuser applied with aluminum deposition (Al deposition) may be used, for example, to configure a reflective diffuser to be served as screen 210. Virtual image display unit 300 includes two mirrors 302, 303 each having a concave face. Two mirrors 302, 303 are respectively disposed eccentric with respect to incident light. Mirrors 302, 303 may each have another surface shape, instead of the concave face.

Also in this exemplary embodiment, similar to the first exemplary embodiment, the emission surface of optical modulation element 207 is inclined with respect to optical axis AX of projection lens 208 so that the emission surface of optical modulation element 207, projection lens 208, and screen 210 satisfy the Scheimpflug condition.

In this exemplary embodiment, an optical path between optical modulation element 207 of projection type image display unit 200 and screen 210, and an optical path between mirror 302 and mirror 303 in virtual image display unit 300 intersect at approximately right angles.

According to the above-described configuration, projected light emitted from projection type image display unit 200 is diffused and reflected by screen 210 to enter into virtual image display unit 300. The light diffused and reflected by screen 210 is reflected by mirrors 302, 303 in virtual image display unit 300 to enter into windshield 102 as image light B.

In particular, in this exemplary embodiment, the optical path between (optical modulation element 207 of) projection type image display unit 200 and screen 210, and the optical path between mirror 302 and mirror 303 in virtual image display unit 300 intersect each other, as described above. Due to the superimposed optical paths, a volume of head-up display 101 can therefore be reduced.

Opening 104 is provided behind screen 210, and, as screen 210, a reflective diffuser is used. Since a reflection surface of screen 210 faces downward, an intermediate image projected from above screen 210 and formed on screen 210 is prevented from directly being viewed. Since the intermediate image on screen 210 is not directly viewed externally from head-up display 101, appearance quality can be maintained.

2-2. Effects and Other Benefits

In this exemplary embodiment, screen 210 is a reflective screen, and the reflection surface of screen 210 faces downward.

Since an intermediate image on screen 210 is prevented from being directly viewed externally from head-up display 101, appearance quality can be maintained.

In this exemplary embodiment, screen 210 is a reflective screen.

The mirror includes mirror 302 (first mirror) into which light reflected from screen 210 enters, and mirror 303 (second mirror) by which light reflected from mirror 302 (first mirror) is reflected toward windshield 102 (combiner).

The optical path between projection lens 208 and screen 210 and the optical path between mirror 302 (first mirror) and mirror 303 (second mirror) intersect at approximately right angles.

Therefore, a length of head-up display 101 can be reduced in a direction of the optical axis of projection lens 208, and accordingly head-up display 101 can be small-sized.

In this exemplary embodiment, screen 210 is a reflective screen, and the reflection surface of screen 210 is provided on a surface opposite to opening 104 with respect to screen 210. Since, even when head-up display 101 is viewed from opening 104, an intermediate image on screen 210 is prevented from being directly viewed, appearance quality can be maintained.

Other Exemplary Embodiments

The exemplary embodiments have been described above and exemplified as the technique of the present disclosure. The accompanying drawings and detailed description have been provided for this purpose.

Accordingly, the components described in the appended drawings and the detailed description include, in order to exemplifying the above described technology, not only essential components, but also components that are not essential. Therefore, it should not be immediately construed that these components that are not essential are essential even if the components are described in the appended drawings and the detailed description.

Since the above described exemplary embodiments are for exemplifying the technique of the present disclosure, various modifications, replacements, additions, and omissions can be made within the scope of the appended claims or of their equivalents.

The present disclosure is applicable to a head-up display mounted in a vehicle, such as a car.

What is claimed is:

1. A head-up display comprising:
   a projection lens that causes light modulated by an optical modulation element to form an intermediate image;
   a screen onto which the intermediate image is formed, the screen including an upper side and a lower side, the upper side being opposite to the lower side; and
   a mirror that projects the intermediate image formed on the screen onto a combiner,
   wherein
   the intermediate image projected by the mirror is reflected by the combiner to allow a user to view a virtual image,
   a normal line to a surface of the screen is inclined with respect to an optical axis of the optical modulation element,
   an emission surface of the optical modulation element is inclined with respect to a principal plane of the projection lens so as to satisfy a Scheimpflug condition with respect to the emission surface of the optical modulation element, the surface of the screen, and the principal plane of the projection lens,
   an upper side of the intermediate image is projected on the upper side of the screen, and a lower side of the intermediate image is projected on the lower side of the screen,
   a length of a first light path from the optical modulation element where the optical axis is located to the upper side of the intermediate image projected on the screen is different than a length of a second light path from the optical modulation element where the optical axis is located to the lower side of the intermediate image projected on the screen,
   the upper side of the intermediate image projected on the screen corresponds to an upper side of the virtual image viewed by the user, and the lower side of the intermediate image projected on the screen corresponds to a lower side of the virtual image viewed by the user, and
   the length of the second light path is longer than the length of the first light path.

2. The head-up display according to claim 1, wherein
   the screen is a transmissive screen,
   a first chief ray that is a chief ray lying at a center of image light emitted from the screen and the optical axis of the projection lens are parallel to each other, and
   a second chief ray that is a chief ray lying at a center of image light emitted from the optical modulation element and the optical axis of the projection lens are parallel to each other.

3. The head-up display according to claim 1, wherein
   the intermediate image has a trapezoidal shape, and
   the lower side of the intermediate image is longer than the upper side of the intermediate image.

4. The head-up display according to claim 1, wherein
   the screen is a reflective screen, and
   a reflection surface of the screen faces downward.

5. The head-up display according to claim 1, wherein
   the screen is a reflective screen,
   the mirror includes a first mirror into which light reflected from the screen enters, and a second mirror for reflecting, toward the combiner, the light reflected from the first mirror, and
   an optical path between the projection lens and the screen and an optical path between the first mirror and the second mirror intersect each other.

6. The head-up display according to claim 1, further comprising
   an opening allowing the intermediate image projected by the mirror to pass through to project the intermediate image toward the combiner,
   wherein
   the screen is a reflective screen, and
   a reflection surface of the screen is provided on a surface opposite to the opening with respect to the screen.

* * * * *